F. W. BRISTOW.
SPRING WHEEL.
APPLICATION FILED DEC. 23, 1912.
1,064,438.
Patented June 10, 1913.
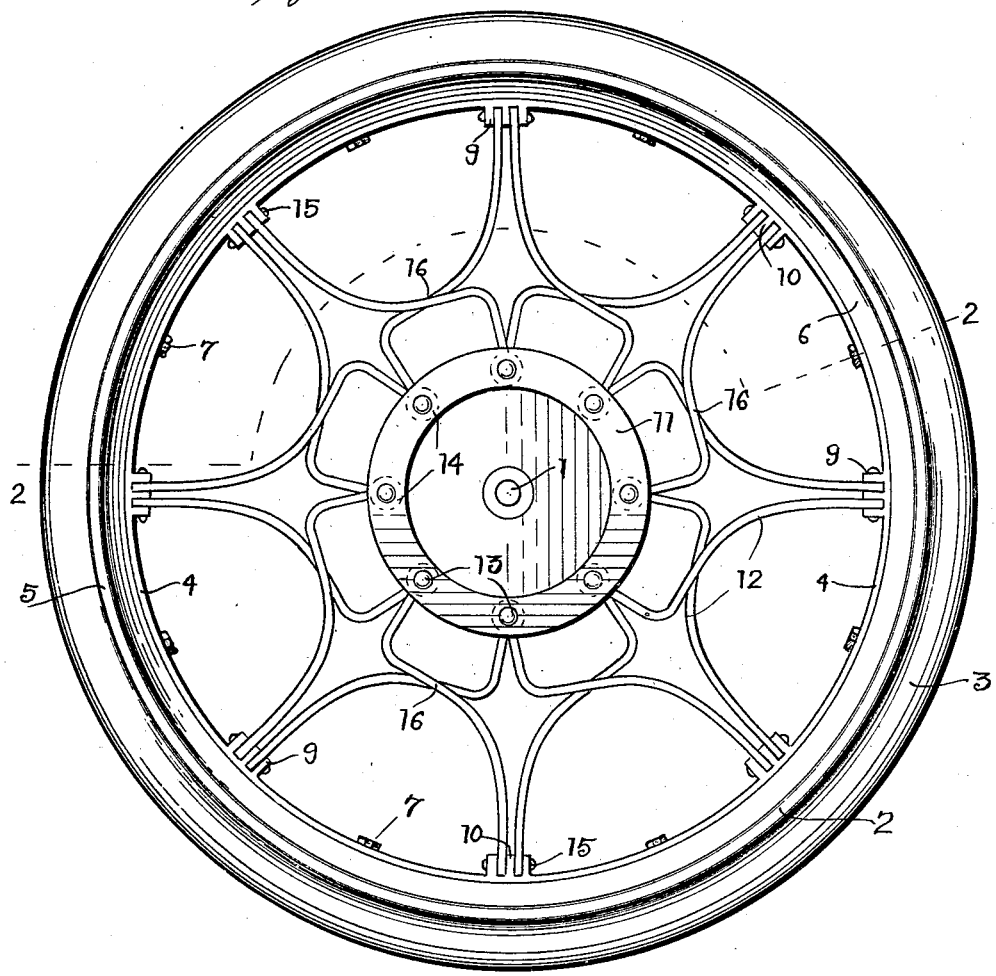
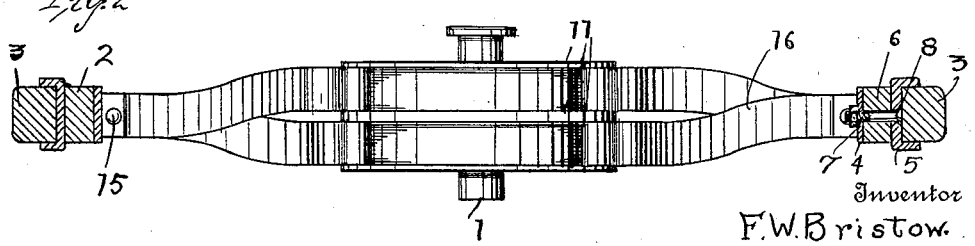
Witnesses
Robert M. Sutphen
A. I. Hind.
Inventor
F. W. Bristow.
By Watson E. Coleman
Attorney

UNITED STATES PATENT OFFICE.

FREDERICK WILLIAM BRISTOW, OF DORRISVILLE, ILLINOIS.

SPRING-WHEEL.

1,064,438.   Specification of Letters Patent.   Patented June 10, 1913.

Application filed December 23, 1912. Serial No. 738,336.

*To all whom it may concern:*

Be it known that I, FREDERICK WILLIAM BRISTOW, a citizen of the United States, residing at Dorrisville, in the county of Saline and State of Illinois, have invented certain new and useful Improvements in Spring-Wheels, of which the following is a specification, reference being had to the accompanying drawings.

This invention relates to improvements in wheels, and more particularly to that class of wheels comprising a hub and a rim having springs interposed therebetween.

An object of this invention is the provision of a spring wheel of this character which will absorb the shock and vibration which is ordinarily imposed upon the body of the vehicle to which the wheels are applied, due to the inequalities in the roadway over which the vehicle is traveling.

A further object of this invention is the provision of a wheel of this character in which the springs are so arranged that the shock and strain imposed upon the wheel will be equally distributed thereto its entire circumference.

With these and other objects in view, my invention consists in certain novel constructions, combinations and arrangements of parts to be hereinafter more fully described, claimed and illustrated in the accompanying drawing, in which, Figure 1 is a side elevation of the wheel, and Fig. 2 is a section on the line 2—2 of Fig. 1.

My improved wheel comprises a hub 1, a rim 2 upon which a solid rubber tire 3 is mounted, the rim comprising inner and outer bands 4 and 5 respectively, between which a wooden band 6 is interposed, the metallic bands and the wooden band being secured together by suitable bolts 7. The bolt heads 8 are preferably countersunk in the outer band 5, so that the bolts will not injure the rubber tire 3.

A plurality of boxes 9 are secured at intervals to the inner band 4 of the rim, the boxes being formed with a partition 10 thereby forming two compartments within each box. Secured to the outer periphery of the hub 1 are a plurality of spaced annular rings 11, the rings being preferably three in number, there being one centrally disposed ring and the other rings being secured to the opposite sides of the hub, thereby forming a pair of annular channels.

The springs 12 are arranged in pairs, the outer ends thereof being disposed in the compartments formed by the partition 10 in the box 9, the springs extending inwardly for a portion of their length and are then curved so that the intermediate portions extend circumferentially of the wheel in opposite directions, the inner ends of the springs being disposed in the channels formed by the rings 11, which are secured to the hub. Disposed through the rings 11, at points radially opposite the boxes 9, are pins 13 on which the looped inner ends 14 of the springs 12 are loosely mounted. The outer ends of the springs are rigidly secured in the boxes 9 by bolts 15, the bolts extending through the boxes and the partitions 10 therein, so as to rigidly secure the outer ends of the springs to the rim. The intermediate portions of the springs 12 are twisted or bent slightly as at 16 so as to allow the adjacent springs to pass each other and expand and contract as the machine travels over the ground. It will be noted that the intermediate portions of each pair of springs are twisted or bent in opposite directions, so that the inner end of one of the springs will be disposed in one of the channels on the hub and the other spring of each pair will be disposed in the other channel on the hub so that the pressure will be distributed equally the entire periphery of the hub. It will be seen that the inner ends of each alternate pair of springs will be disposed in radial alinement with the outer ends of the adjacent pair of springs so that the ends of four of the springs will be disposed in radial alinement with each other at the points of connection between the springs and the rim and hub. By reason of the twists 16 in the springs, the intermediate portions thereof will be strengthened so that the shock and strain will be equally distributed the entire length of the springs.

From the above description, taken in connection with the accompanying drawing, it will be seen that I have provided a spring wheel which will be efficient in use, which is composed of a minimum number of parts, and which may therefore be cheaply manufactured, and one in which the shock or strain will be equally distributed throughout the entire wheel.

Having thus fully described my invention, what I desire to claim and secure by Letters Patent is:

A wheel of the class described comprising a hub and a rim, boxes secured at intervals to said rim, each of said boxes being formed with a partition wall, said hub being formed with annular channels, springs arranged in pairs disposed between said rim and said hub, the outer ends of each pair of springs being secured in one of said boxes upon the opposite sides of said partition plate whereby the outer ends of said springs are spaced, the intermediate portions of said springs extending circumferentially of the wheel in opposite directions, the inner end of one spring of each pair being pivotally mounted in one of the channels in the hub, and the inner end of the other spring of each pair being pivotally mounted in the other channel in the hub, and said circumferentially extending portions of each pair of springs being offset in opposite directions, as and for the purpose described.

In testimony whereof I hereunto affix my signature in the presence of two witnesses.

FREDERICK WILLIAM BRISTOW.

Witnesses:
S. A. WALLACE,
WILL HUDGINS.